US008847553B2

(12) United States Patent
Bohan, Jr. et al.

(10) Patent No.: US 8,847,553 B2
(45) Date of Patent: Sep. 30, 2014

(54) MOBILE POWER SYSTEMS FOR HIGH POWER APPLICATIONS

(75) Inventors: John E. Bohan, Jr., Avon Lake, OH (US); John Butkowski, North Ridgeville, OH (US); Dale Garrett, Avon, OH (US); Norm Siegel, Mentor, OH (US)

(73) Assignee: R.W. Beckett Corporation, North Ridgeville, OH (US)

( * ) Notice: Subject to any disclaimer, the term of this patent is extended or adjusted under 35 U.S.C. 154(b) by 388 days.

(21) Appl. No.: 13/251,589

(22) Filed: Oct. 3, 2011

(65) Prior Publication Data

US 2013/0082661 A1    Apr. 4, 2013

(51) Int. Cl.
| | | |
|---|---|---|
| *H02J 7/00* | (2006.01) | |
| *H01M 10/44* | (2006.01) | |
| *H01M 10/42* | (2006.01) | |
| *H01M 10/48* | (2006.01) | |
| *H01M 16/00* | (2006.01) | |
| H01M 10/0525 | (2010.01) | |
| H01M 2/12 | (2006.01) | |
| H01M 2/20 | (2006.01) | |
| H01M 2/10 | (2006.01) | |
| H01M 2/02 | (2006.01) | |

(52) U.S. Cl.
CPC ........ *H01M 10/4221* (2013.01); *H01M 10/443* (2013.01); *H02J 7/0021* (2013.01); *H01M 10/0525* (2013.01); *H01M 2/12* (2013.01); *H01M 10/425* (2013.01); *H01M 10/4257* (2013.01); *H01M 2200/00* (2013.01); *H01M 2/20* (2013.01); *H01M 10/482* (2013.01); *Y02E 60/12* (2013.01); *H01M 2/1077* (2013.01); *H01M 10/486* (2013.01); *H01M 16/00* (2013.01); *H02J 7/0026* (2013.01); *H01M 10/4207* (2013.01); *H01M 2010/4278* (2013.01); *H01M 2010/4271* (2013.01); *H01M 2/0245* (2013.01); *H02J 7/0016* (2013.01); *H01M 10/441* (2013.01)
USPC .......................................... 320/134; 320/107

(58) Field of Classification Search
CPC .... Y02E 60/12; H01M 10/48; H01M 6/5044; H02J 7/0026; H02J 2007/005
USPC ....................................................... 320/134
See application file for complete search history.

(56) References Cited

U.S. PATENT DOCUMENTS

| | | | |
|---|---|---|---|
| 7,157,881 B1 | 1/2007 | Benchenstein, Jr. et al. | |
| 2005/0077878 A1* | 4/2005 | Carrier et al. | 320/134 |
| 2005/0242775 A1* | 11/2005 | Miyazaki et al. | 320/116 |
| 2008/0157721 A1* | 7/2008 | Kaneko et al. | 320/136 |
| 2009/0153100 A1* | 6/2009 | Okumura et al. | 320/116 |
| 2011/0106330 A1* | 5/2011 | Lickfelt | 700/297 |
| 2012/0049801 A1* | 3/2012 | Chang | 320/132 |

* cited by examiner

*Primary Examiner* — Arun Williams
(74) *Attorney, Agent, or Firm* — Eschweiler & Associates, LLC (57) ABSTRACT

Some embodiments relate to a mobile power system. The system includes a first battery module including a number of rechargeable cells. A first battery module current limiter is configured to monitor a current flowing to or from the plurality of rechargeable cells of the first battery module. The battery module current limiter is further configured to selectively limit the current flowing to a non-zero current that is less than a predetermined current threshold, wherein the selectively limiting is based on whether the monitored current is approaching the predetermined current threshold.

18 Claims, 6 Drawing Sheets

MOBILE POWER SYSTEMS FOR HIGH POWER APPLICATIONS

BACKGROUND

As consumers are becoming more environmentally conscientious, they are turning more and more to alternative energy sources. One such alternative energy source is rechargeable batteries, such as lithium ion batteries for example. Conventional rechargeable batteries are deployed primarily in low power electronic devices (e.g., cameras, cell phones, and audio players), and are ill-suited in many regards for high power applications.

One of the reasons for this is that individual rechargeable batteries typically deliver only a modest amount of power, which is insufficient for high power applications. In addition, if one were to try to assemble a large number of rechargeable batteries together to provide a high power signal; due to the small internal resistance of the batteries, any imbalance between the voltages of the individual batteries can cause large current spikes that can damage the batteries or the devices they are to power. Accordingly, the present disclosure provides improved techniques for mobile power systems that make use of rechargeable batteries and which are well-suited for high power applications.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Figure 1:
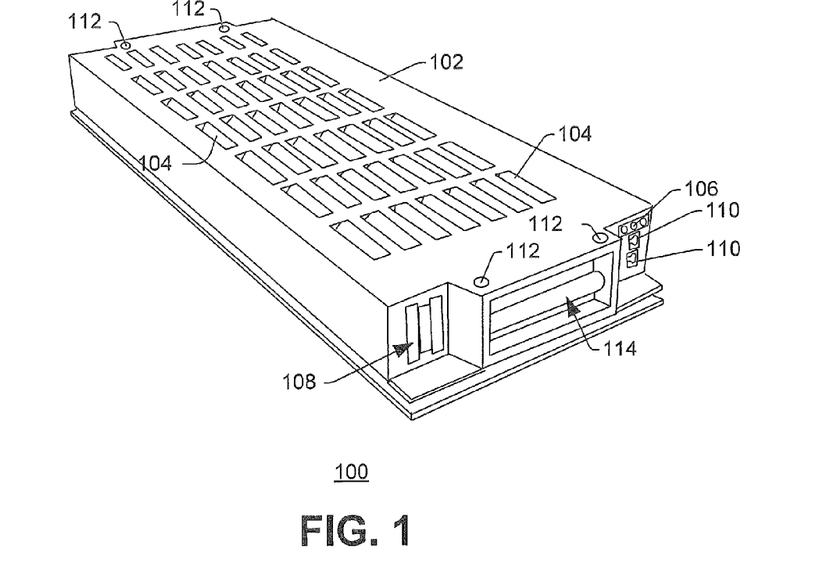
FIG. 1 is a perspective view of a mobile power system with its case closed in accordance with some embodiments.
Figure 2:
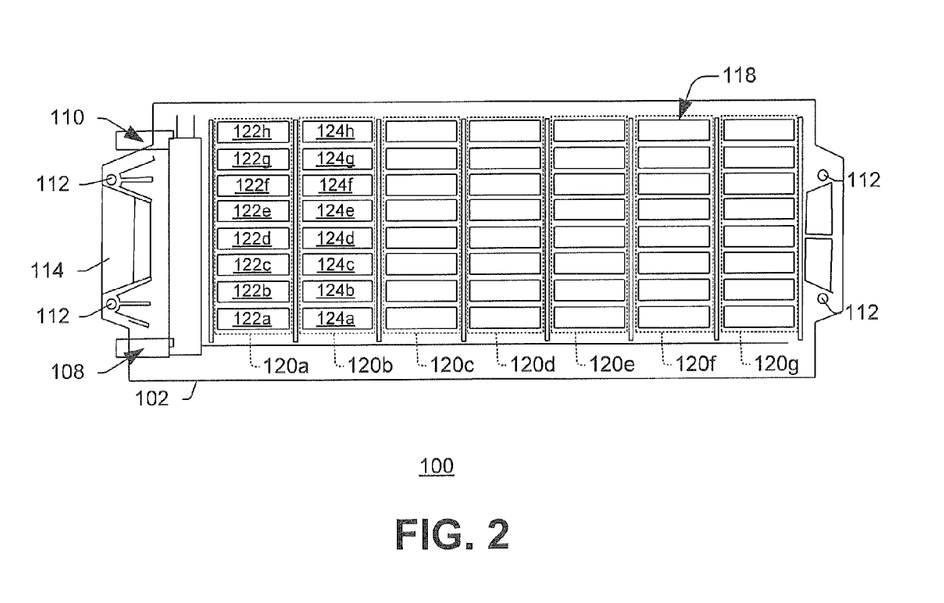
FIG. 2 is a top view of FIG. 1's mobile power system with its case open in accordance with some embodiments.

FIGS. 1-2 show a battery module 100 in accordance with some aspects of the present invention. In particular, FIG. 1 shows a perspective view of a battery module 100 with its case 102 closed, while FIG. 2 shows a top view of the battery module 100 with its case 102 opened. As can be appreciated when collectively viewing FIGS. 1-2, when the cover of the case 102 is closed, the closed case forms an interior chamber which is large enough to house a number of rechargeable batteries or "cells" 118. The exterior surface of the case 102 can include temperature regulation vent(s) 104, visual display(s) 106, battery charging/discharging port(s) 108, communication port(s) 110, fastening element(s) 112, and handle(s) 114.

The visual display 106, which can be made up of LEDs for example, can provide status information regarding rechargeable batteries in the case 102. Among other things, this status information can specify whether the rechargeable batteries are in a safe state or an unsafe state; whether the batteries need to be charged or are fully charged or are charging; and/or whether an error or fault has occurred with respect to charging or discharging of the batteries.

The communication port 110 is configured to establish communication between the mobile power system 100 and a network (e.g., LAN, WAN, or the Internet). Within the case, a network identification number module (not shown) can transmit a network identification number, which uniquely identifies the particular battery module 100, to another party via the communication port 110. Thus, when batteries need to be recharged or when a failure or error state arises, the communication port 110 enables the battery module 100 to identify itself to a technician by transmitting its network identification number, and to transmit an error message that notifies the technician of the problem to be rectified.

The case 102 can also include a wake-up switch (e.g., transistor or simple electro-mechanical switch) configured to selectively disconnect the exterior port(s) (e.g., 108) from the cells, thereby limiting danger during shipping or handling of the mobile battery module. For example, the mobile battery module can be put in "sleep mode" for transport, which can disconnect the exterior port(s) from the cells to ensure no voltage present on the battery charging/discharging port 108. After the case arrives at the destination and is installed, the wake up-switch can be toggled (e.g., by a technician or by sensing a live voltage/load—such as in a plug-and-play scheme) to connect the exterior port(s) to the cells. The sleep mode can also provide power savings, as the battery module shuts down various components to conserve power while asleep.

As shown in FIG. 2, the cells 118 are arranged in N blocks 120a-120g, wherein each block 120 can include M cells. For example, a first block 120a includes cells 122a-122h; a second block 120b includes cells 124a-124h; and so on. Although FIG. 2 shows an example where N=7 and M=8, in other embodiments M and N can be other integers, and different blocks could include different numbers of cells thereon. In addition, the blocks can individually and/or collectively include different types or models of battery cells in some embodiments, and not all blocks and/or cells need be inserted in all cases (i.e., there can be "missing" or "empty" battery cells and/or blocks).

Electrical connections couple the cells to the charging/discharging port 108, such that the rechargeable cells 118 can be charged via the port 108 and/or can discharge to the port 108. In some embodiments, the blocks 120a-120g are arranged in series with one another, while the cells on a given block (e.g., cells 122a-122h on block 120a) are arranged in parallel. However, in other embodiments the blocks 120a-120g can be in parallel with one another, and the cells can be in series along a given block. Either configuration enables the battery module 100 to potentially have a longer active life (e.g., due to parallel connections) and/or provide large voltages (due to the series connections), relative to an individual battery. In addition, in some embodiments in which the N blocks arranged in parallel and the M cells are arranged in series, the system can include an electrical connection to couple rechargeable cells of adjacent blocks in parallel with one another, such that the cells are in parallel and in series with one another.

For instance, consider an example consistent with FIG. 2 where each cell (e.g., 122a) corresponds to a single 5V lithium-ion battery. Because each block 120 includes M=8 cells, each block 120 can deliver a 5V output signal and this output signal can be asserted for eight times longer than a single 5V lithium battery due to the parallel arrangement. Further, because N=7 blocks are arranged in series, the module 100 can output a 35V signal (due to the series connection of seven blocks each delivering a 5V signal).

Figure 3A:
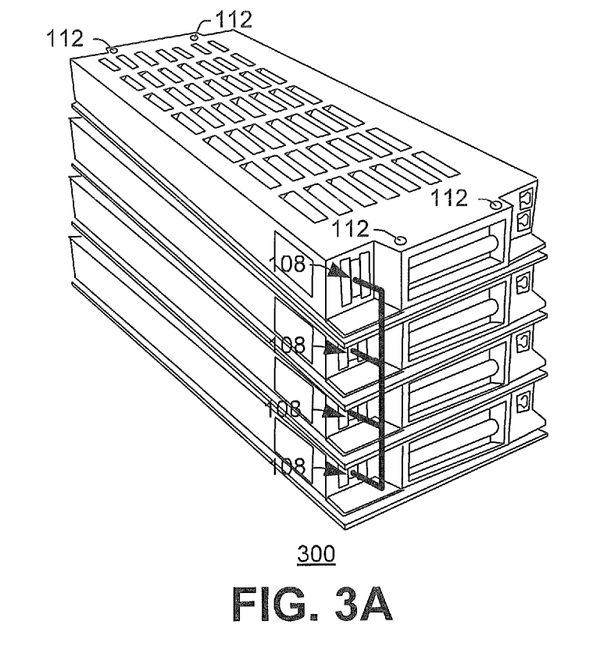
FIG. 3A is a perspective view of a string that includes multiple battery modules in accordance with some embodiments.
Figure 3B:
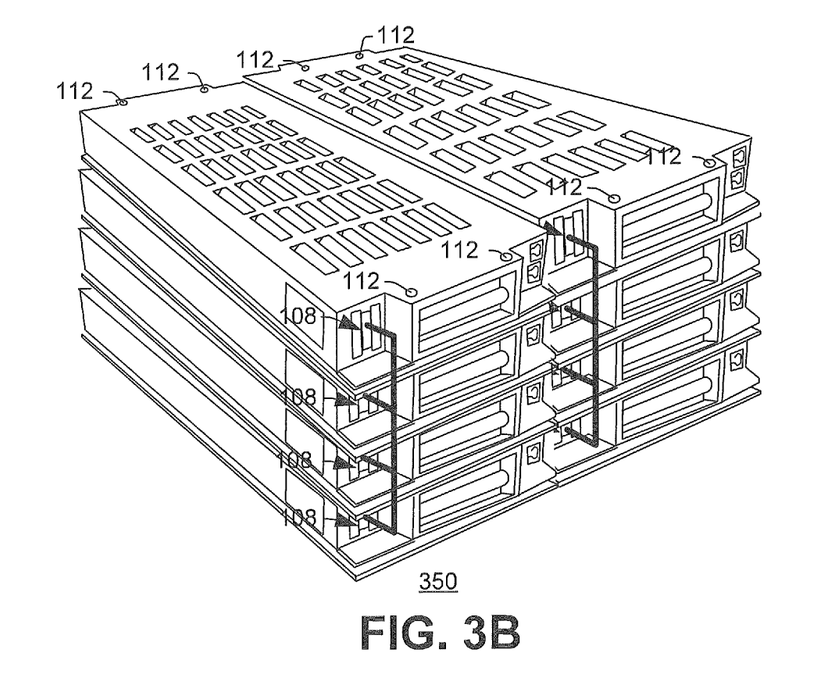
FIG. 3B is a perspective view of a pack that includes two strings of mobile battery modules in accordance with some embodiments.

In some embodiments, fastening elements 112 (e.g., threaded holes and corresponding bolts) allow multiple battery modules (e.g., 100) to be securely fastened together to form a larger mobile power system 300, such as shown in FIG. 3. Within such a mobile power system 300, the battery modules' respective charging/discharging terminals 108 can be coupled in series or in parallel to realize a string of battery modules, wherein the string of battery modules provides even larger power outputs than a single battery module. With regards to electrical connections, the individual battery modules 100 can be daisy-chained together at their exterior ports 108 so as to be coupled in series, although they could also be coupled in parallel. As shown in FIG. 3B, multiple strings 300 can be coupled together in parallel to form a battery pack 350, which often has an external controller that regulates charging and discharging currents there from.

Because battery modules can be modular in this way, they can be easily replaced by technicians for service or upgrade, and can be reconfigured in a vast number of arrangements so as to be well-suited for a wide array of applications. By including such configurations, the present disclosure provides mobile power systems that are well suited for a wide variety of high power applications. However, the significant number of rechargeable batteries included in such configurations can cause safety concerns if appropriate countermeasures are not in place. For example, voltage/current imbalance between the cells, blocks, and/or modules during charging or discharging can lead to large power spikes. In some instances, these spikes can be large enough to melt common wires.

Figure 4:
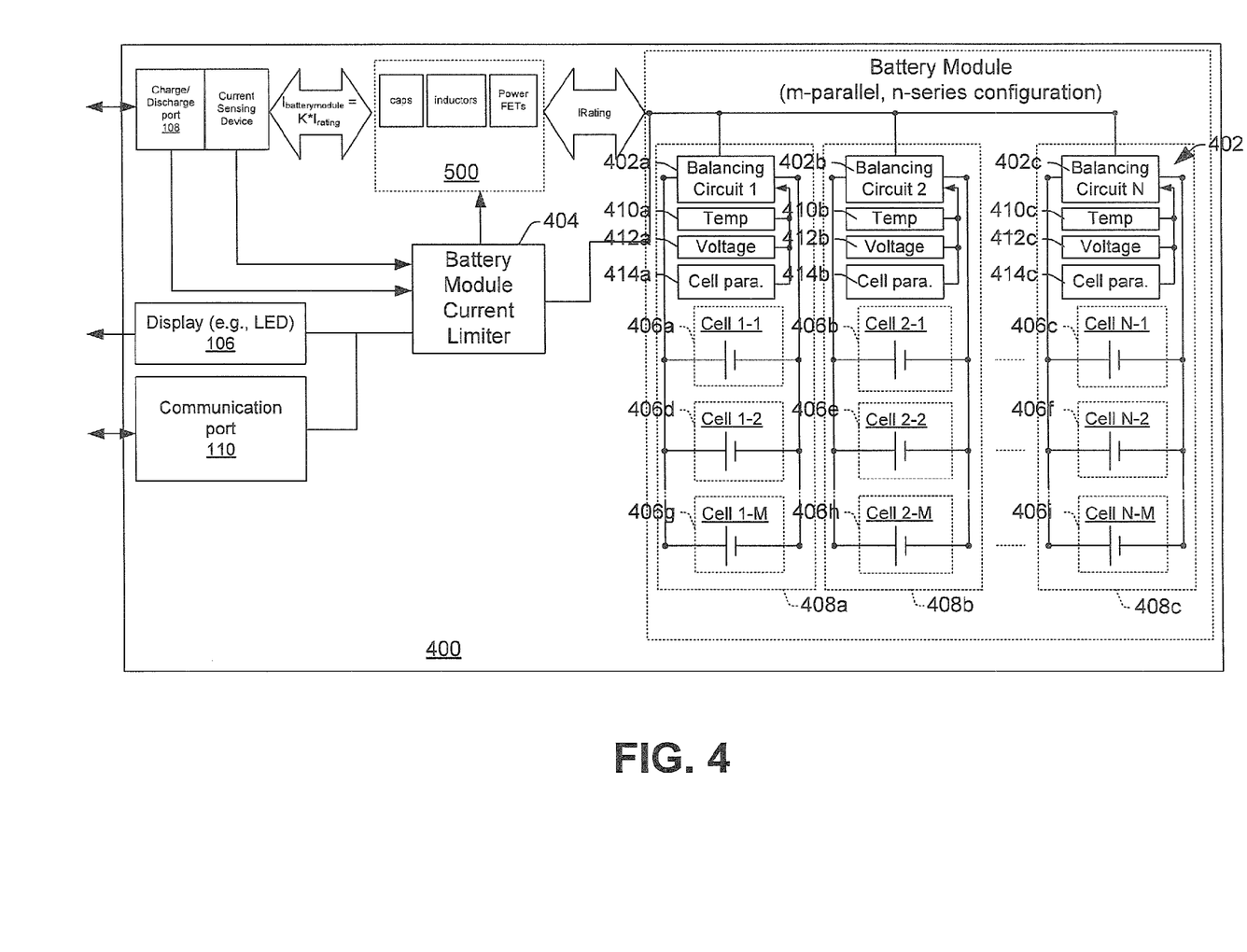
FIG. 4 is a block diagram of a mobile power system that includes a battery module including a current limiter.

Turning now to FIG. 4, one can see an electrical block diagram of a battery module 400 (e.g., battery module 100 in FIG. 1), which includes a series of balancing circuits 402a, 402b, 402c and a battery module current limiter 404 that limit power spikes and other over-current and/or over-voltage conditions, in accordance with some embodiments.

Like previous embodiments, the mobile power system 400 can include a number of rechargeable batteries or cells (406a-406i). These cells 406 can be arranged in series and/or in parallel, depending on the implementation. Like FIG. 2's previously described implementation, these cells 406 can be arranged in blocks. For example, FIG. 4 illustrates N blocks (408a, 408b, . . . , 408c), each of which includes M cells.

Because maximum current tolerated by a given cell (e.g., 406a) and/or a given block (e.g., 408a) may depend on temperature, voltage, and/or parameters specific to the individual cell (e.g., manufacturer model), the battery module 400 can also include respective temperature sensors (e.g., 410a), voltage sensors (e.g., 412a), and cell parameters (e.g., 414a) along respective blocks.

Because the current passing to or from a block (e.g., block 408a) is a superposition of currents from the individual cells in a block, the balancing circuits 402a-402c can continuously monitor the current flowing to or from their corresponding blocks, and can divert current away from their corresponding blocks while charging, or bleed current/charge out of their corresponding blocks while sitting idle. The balancing circuits divert or bleed current based on the voltage, temperature and cell parameters of cells in their respective blocks.

Because the current passing to or from the module 400 is a superposition of currents from the individual blocks 408a, . . . , 408c, the balancing circuits 402 are often unable to analyze power spikes caused by such super-positions of currents from multiple blocks. To adequately limit such power spikes, the battery module current limiter 404 can continuously monitor the current flowing to or from the charge/discharge port 108, and can selectively limit this current if the monitored current exceeds a pre-determined and potentially damaging current threshold for the battery module 400. In this way, the battery module current limiter 404 can selectively limit current to or from the battery module 400 to prevent damage. The battery module current limiter 404 can also limit current based on the voltage, temperature and cell parameters of batteries in their respective battery blocks.

In general, when the battery module current limiter 404 detects that a current in the battery module 400 is approaching a predetermined (e.g., potentially damaging) current level, the current limiter 404 changes its state to limit the current. Often, the current limiter 404 reduces the current to a non-zero current value that is less than the predetermined (e.g., potentially damaging) current level, thereby limiting or preventing damage to the mobile power system and any devices to which it is supplying power. This pre-determined current level need not be a fixed (static) value, but can change in real-time based on the measured temperature, output voltage, and/or current.

Figure 8:
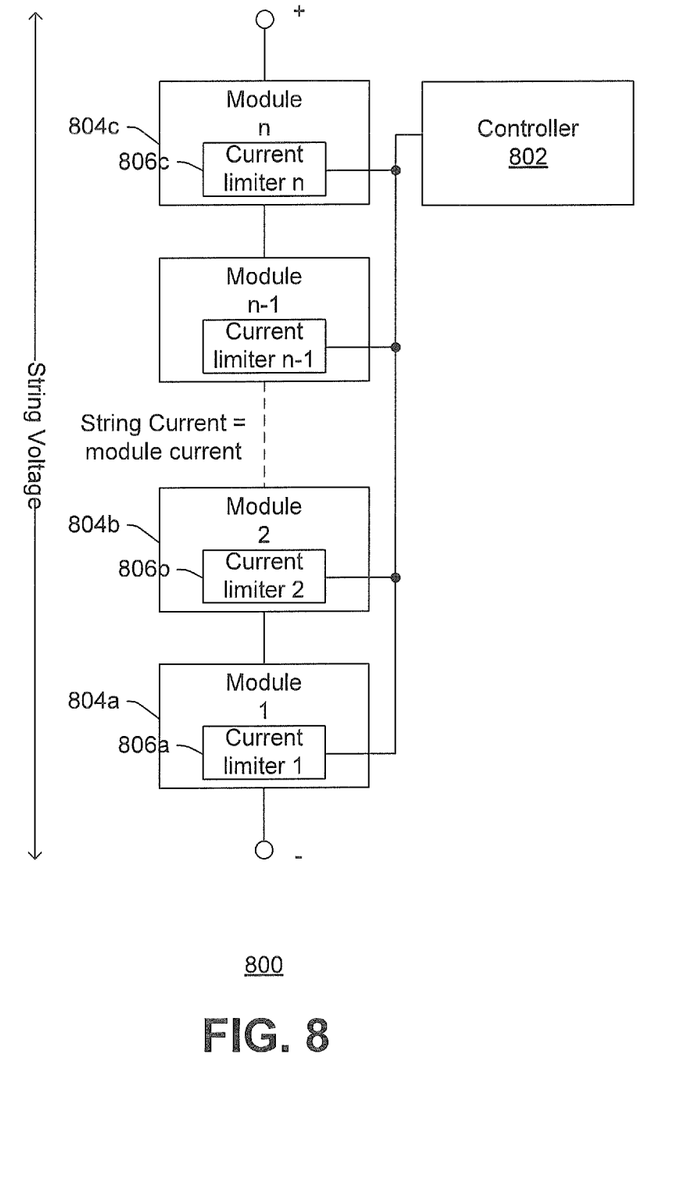

FIG. 8 shows an example of how a higher level controller 802 can limit currents for a string 800, which includes multiple battery modules (e.g., string as shown in FIG. 3A or 3B). The string 800 includes N modules (804a, 804b, . . . 804d), which are arranged in series with one another. Because of this, the voltage on the ends of the string 800 is equal to the sum of the voltages of each module. The string current, in contrast, is the same through each module.

Thus, the higher level controller 802 can induce a change in a current limiter (e.g., current limiter 806a) within a given module (e.g., module 804a in FIG. 4), wherein each module can have its own current limiter. Although the higher level controller 802 could limit the current through multiple modules, it is sufficient to have the higher level controller 802 simply limit the current through only one module because this also limits the current through the other modules as well. The current limit is defined by the operating point of the cells or blocks within a given module (e.g., temperature and/or cell parameters). If only one module's current limiter is used to limit current, the other modules' current limiters can be disabled so the current thought the other modules is set by the enabled current limiter. The controller 802 can also survey all of the battery modules to identify the cell block that exhibits the limiting factor, and can then adjust the current limit accordingly. The controller can also cycle through all of the battery modules so that a single module isn't limiting all of the time and prematurely wearing out.

Figure 5:
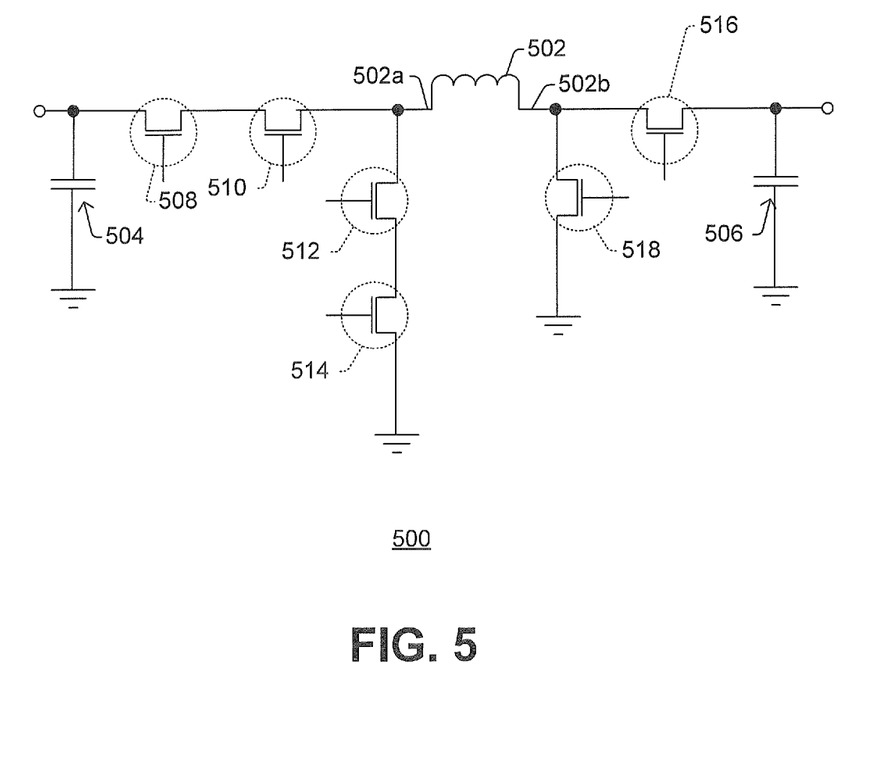
FIG. 5 is a circuit diagram of a battery charger/discharger that includes current limiting elements thereon.

FIG. 5 shows another embodiment of a battery pack charger/discharger 500 (e.g., battery pack charger/discharger 500 in FIG. 4), which includes current limiting functionality. The battery pack charger/discharger 500 can receive control signals from the current limiter (e.g., 404 in FIG. 4), which can be a hardware or software algorithm driving the charger/discharger 500.

In FIG. 5's embodiment, the battery pack charger/discharger 500 takes the form of a buck-boost DC-to-DC converter. Thus, this DC-to-DC converter can step down voltages (e.g., "buck" voltages) or can step up voltages (e.g., "boost" voltages) to facilitate battery charging and/or discharging. The battery pack charger/discharger 500 includes an inductor 502 having first and second terminals (502a, 502b), an output terminal capacitor 504, and a battery terminal capacitor 506. Charging field effect transistors (FETs) 508, 510 and charging shunt FETs 512, 514 are disposed between the first inductor terminal 502a and the output terminal. A discharging FET 516 and discharging shunt FET 518 are disposed between the second inductor terminal 502b and the battery terminal.

During battery charging, the charging FETs 508, 510 and discharging FET 516 are in a steady ON state, so long as the monitored current is less than the predetermined values (e.g., maximum permissible current). The charging and discharging shunt FETs 512, 514, and 518 are off during normal battery charging.

During battery charging, peak currents can be limited to less than a pre-determined current threshold as follows. At low currents series FETs 508 and 510 are on, and shunt FETs 512 and 514 are off with no PWM switching. If the charging current exceeds the pre-determined threshold, then a PWM signal will be applied to FETs 508-514 simultaneously and out-of-phase to "chop" the current below the current threshold.

Similarly, during battery discharging, peak currents can be limited to less than the pre-determined current threshold as follows. At low currents, series FET 516 is on, and shunt FET 518 is off with no PWM switching. If the discharge current exceeds the pre-determined threshold, then a PWM signal will be applied to FETs 516 and 518 simultaneously and out-of-phase to "chop" the discharging current below the current threshold.

Figure 6:
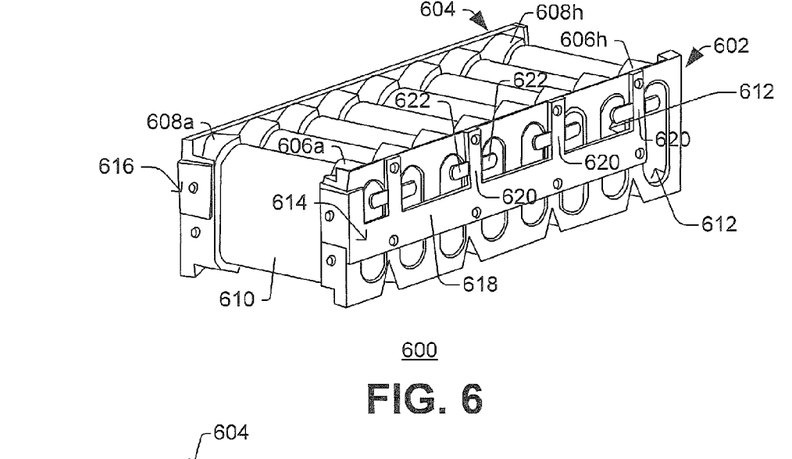
FIG. 6 is a perspective view of a battery block that includes multiple cells in accordance with some embodiments.
Figure 7:
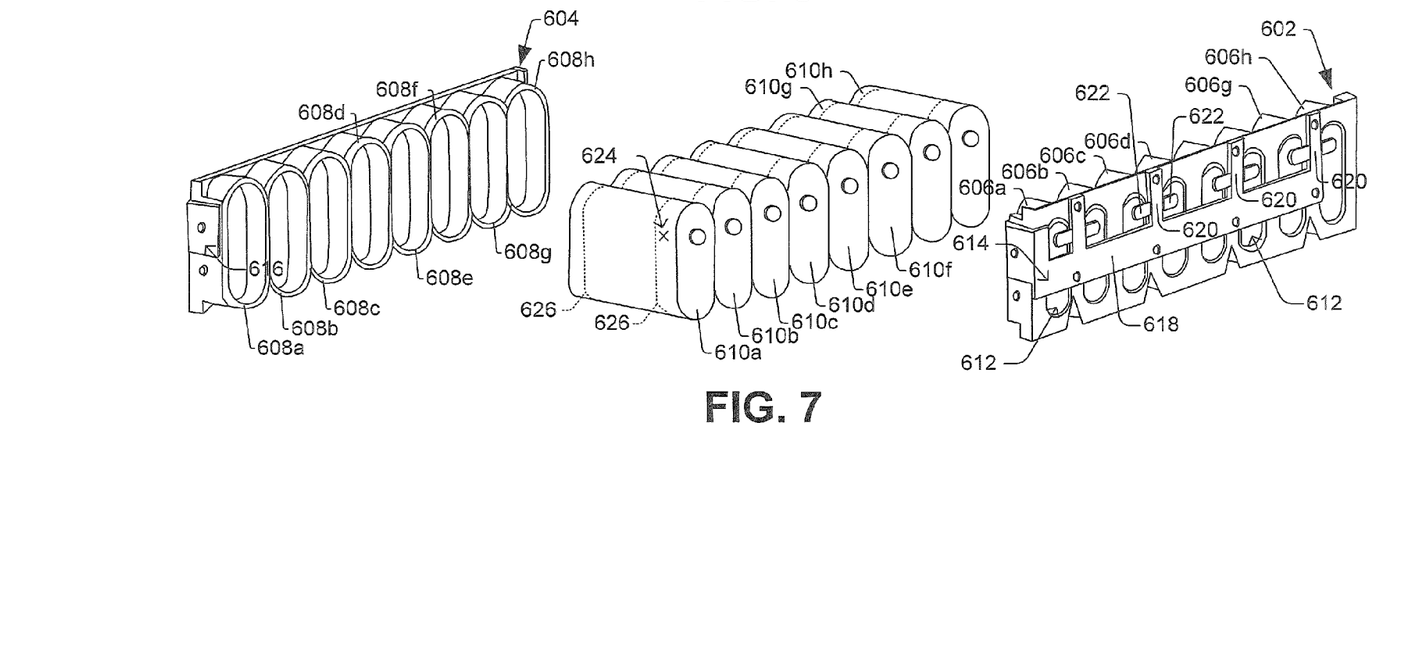
FIG. 7 is an exploded perspective view of a battery block in accordance with some embodiments.

Turning now to FIGS. 6-7, one can see a block 600 (e.g., block 408a in FIG. 4) in accordance with some embodiments. The block 600 includes a pair of opposing sidewalls 602, 604. The first sidewall 602 includes a number of first end caps 606a-606h extending there from. Similarly, the second sidewall includes a number of second end caps 608a-608h extending there from. The first and second end caps 606, 608 are arranged to cooperatively hold a number of cells (610a-610h), respectively, there between. The sidewalls 602, 604 also include apertures that 612 are designed to be aligned with the terminals of the cells when the cells are inserted.

Conductive rails 614, 616 extend alongside the respective sidewalls. To withstand large currents that may occurs in high power applications, the conductive rails 614, 616 may in some embodiments be quite substantial. To strike a good balance between performance and material cost, the rails may have a branch structure to correspond to the currents expected to flow though the rails. Thus, each conductive rail 612 can include a relatively thick trunk 616 and several thinner branches 618. Conductive tabs 620 extend from the branches so as to connect to the terminals of the batteries. In one embodiment, the conductive rails 612 can be made of copper having a thickness of about 0.03 inches, and the trunks 616 can have a width of about 0.50 inches while the branches 618 can have widths of about 0.38 inches.

The surface geometry of the end caps are often structured to receive a number of different types of batteries. For example, in many embodiments, each pair of corresponding end caps (e.g., 606, 608) can receive either a single prismatic battery or a pair of 18650 batteries. An 18650 battery typically has a diameter of approximately 18 mm and a height of approximately 65 mm; while a prismatic battery has about the same height as an 18650 battery and an approximate diameter/width that is about twice that of an 18650 battery.

In some embodiments, the cells can each include at least one pressure-relief vent in a cover thereof. If present, this pressure-relief vent selectively vents pressure from the cell to limit pressure build-up and help reduce overheating in the cell. To prevent hot, vented air from "cascading" from one cell to the next (which could potentially cause cascaded overheating of the cells), the end caps can have sufficient height so as to extend over the pressure-relief vents. Thus, the end caps can deflect hot, vented air from an overheated cell away from an adjacent cell to help prevent cascaded overheating of cells.

To secure a block 600 in a battery module (e.g., module 100 in FIG. 1), the battery module typically includes an engagement element on an inner surface thereof. For example, a rib can extend from the inner surface of the case between adjacent blocks. The rib extends into the inner cavity of the battery module such that adjacent sidewalls of the first and second blocks abuttingly engage the rib. Thus, the rib helps a user to easily align blocks in the inner cavity of the battery module, thereby helping to ensure good electrical connections when the blocks are inserted. Engagement elements can take other forms in other embodiments. For example, other engagement elements can comprise one or more posts which serve as guides for the battery strings, or can comprise threaded holes in the blocks and corresponding threaded holes in the case, wherein screws or other fasteners secure the blocks in the case at pre-determined locations. In still other embodiments, an engagement element can comprise a tab extending from the block and which engages a recess in the case. Other arrangements also fall within the scope of the present disclosure.

Although the disclosure has been shown and described with respect to one or more implementations, equivalent alterations and modifications will occur to others skilled in the art based upon a reading and understanding of this specification and the annexed drawings. For example, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. Also, although the disclosure above has mentioned lithium ion cells as one type of rechargeable batteries, it will be appreciate that other types of rechargeable cells can also be included. For example, rechargeable cells can also include rechargeable alkaline, lead acid, nickel cadmium, nickel metal hydride, lithium ion polymer, NiH2, NiMH, Ni Zinc, and lithium titanate, among others. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A mobile power system, comprising:
a first battery module comprising a case with an interior chamber to store N blocks of batteries arranged in series with one another, wherein the case includes a battery charging/discharging port through which the N blocks of batteries are charged and discharged and wherein a block of batteries includes M rechargeable cells arranged in parallel along the block, wherein N and M are integers greater than one, and wherein the case of the first battery module is configured to be fastened to at least one additional case of at least one additional battery module;
a first battery module current limiter configured to monitor current flowing between the N blocks of batteries and the battery charging/discharging port in the case; and further configured to selectively limit the current flowing to a non-zero current that is less than a predetermined current threshold, wherein the selectively limiting is based on whether the monitored current is approaching the predetermined current threshold.

2. The mobile power system of claim 1, wherein the predetermined current threshold corresponds to a potentially damaging current level that can catastrophically damage the mobile power system.

3. The system of claim 1, wherein the first battery module further comprises:
N balancing circuits coupled to the N blocks of batteries, respectively, wherein a balancing circuit is configured to balance current to or from rechargeable cells in its corresponding block independent of the other blocks; and
wherein the first battery module current limiter monitors current flowing to or from the N blocks of batteries while the N balancing circuits are balancing currents for their respective N blocks of batteries.

4. The system of claim 3, wherein the first battery module further comprises:
N temperature sensors coupled to the N blocks of batteries, respectively, wherein the balancing circuit is configured to balance current to or from rechargeable cells in its corresponding block based on a temperature from its corresponding temperature sensor.

5. The system of claim 3, wherein the first battery module further comprises:
N voltage sensors coupled to the N blocks of batteries, respectively, wherein the balancing circuit is configured to balance current to or from rechargeable cells in its corresponding block based on a temperature from its corresponding temperature sensor.

6. The system of claim 1, further comprising:
a charging and discharging element configured to selectively charge and discharge the rechargeable cells,
wherein the battery module current limiter keeps current to and from the rechargeable cells during charging and discharging to a non-zero value that is less than the pre-determined current threshold.

7. The system of claim 6, wherein the charging and discharging element comprises a DC-to-DC converter that comprises at least one active circuit element therein.

8. The system of claim 6, wherein the DC-to-DC converter is a buck-boost converter.

9. The system of claim 6, wherein the DC-to-DC converter comprises:
an inductor coupled between an exterior terminal of the mobile power system and a battery terminal, wherein the battery terminal is coupled to the plurality of cells in the first battery module;
a first current leg coupled between a first terminal of the inductor and the exterior terminal and including a first charging transistor thereon;
a second current leg coupled between the first terminal of the inductor and ground and including a second charging transistor thereon;
a third current leg coupled between a second terminal of the inductor and the battery terminal and including a third charging transistor thereon;
a fourth current leg coupled between the second terminal of the inductor and ground and including a fourth charging transistor thereon.

10. The system of claim 1, wherein the first battery module is configured to receive at least two different types or models of rechargeable cells.

11. The system of claim 1, further comprising:
a second battery module comprising a plurality of rechargeable cells;
a second battery module current limiter configured to monitor a current flowing to or from the plurality of rechargeable cells in the second battery module; and further configured to selectively limit the current flowing to a non-zero current that is less than the predetermined current threshold, wherein the selectively limiting in the second battery module is based on whether the monitored current in the second battery module is approaching the predetermined current threshold.

12. The system of claim 11, further comprising:
a higher level controller to monitor current flowing to or from the first and second battery modules, and selectively induce a change in the first or second current limiter to limit current flow to or from the first and second battery modules.

13. The battery module of claim 1, wherein the batteries are lithium ion batteries.

14. The mobile battery module of claim 1, further comprising:
an exterior port disposed on a surface of the case and coupled to the plurality of rechargeable cells; and
a wake-up switch configured to disconnect the exterior port from the plurality of cells, thereby limiting danger during shipping or handling of the mobile battery module.

15. The mobile battery module of claim 1, further comprising:
a display to provide status information with regards to whether the rechargeable cells are in a safe state or an unsafe state or whether an error or fault has occurred with respect to charging or discharging of the rechargeable cells.

16. The mobile battery module of claim 1, further comprising:
a communication port configured to interface to a network.

17. The mobile battery module of claim 16, further comprising:
a network identification number module to transmit a network identification number to another party on the network via the communication port, wherein the network identification number uniquely identifies the mobile battery module.

18. The mobile battery module of claim 16, further comprising:

a diagnostic module to monitor for an error or fault state of the cells and to transmit a diagnostic message indicating the error or fault state over the network via the communication port.

\* \* \* \* \*